(12) United States Patent
Kienzle et al.

(10) Patent No.: US 11,085,807 B2
(45) Date of Patent: Aug. 10, 2021

(54) FILL LEVEL MEASUREMENT DEVICE WITH POTENTIAL ISOLATION IN A WAVEGUIDE

(71) Applicant: VEGA Grieshaber KG, Wolfach (DE)

(72) Inventors: Klaus Kienzle, Zell am Harmersbach (DE); Daniel Schultheiss, Hornberg (DE); Fritz Lenk, Schiltach (DE); Roland Baur, Koenigsfeld (DE)

(73) Assignee: VEGA GRIESHABER KG, Wolfach (DE)

( * ) Notice: Subject to any disclaimer, the term of this patent is extended or adjusted under 35 U.S.C. 154(b) by 353 days.

(21) Appl. No.: 16/188,705

(22) Filed: Nov. 13, 2018

(65) Prior Publication Data

US 2019/0145813 A1    May 16, 2019

(30) Foreign Application Priority Data

Nov. 14, 2017 (EP) .................................... 17201675

(51) Int. Cl.
| | |
|---|---|
| *G01F 23/284* | (2006.01) |
| *H01Q 1/22* | (2006.01) |
| *H01Q 13/02* | (2006.01) |
| *G01S 13/88* | (2006.01) |

(52) U.S. Cl.
CPC ............ *G01F 23/284* (2013.01); *G01S 13/88* (2013.01); *H01Q 1/225* (2013.01); *H01Q 13/02* (2013.01)

(58) Field of Classification Search
CPC ....... G01F 23/284; G01S 13/88; H01Q 1/225; H01Q 13/02

USPC ...................................................... 73/290 Q
See application file for complete search history.

(56) References Cited

U.S. PATENT DOCUMENTS

| | | | | |
|---|---|---|---|---|
| 5,880,698 A | * | 3/1999 | Burger .................... | G01N 22/00 |
| | | | | 343/772 |
| 6,155,112 A | * | 12/2000 | Eckert .................... | G01F 23/284 |
| | | | | 73/290 V |
| 6,202,485 B1 | * | 3/2001 | Wien ...................... | G01F 23/284 |
| | | | | 73/290 R |
| 6,469,676 B1 | * | 10/2002 | Fehrenbach .......... | G01F 23/284 |
| | | | | 343/786 |
| 6,658,932 B2 | * | 12/2003 | Munley .................. | G01F 23/284 |
| | | | | 333/252 |
| 7,134,315 B1 | * | 11/2006 | Stigler ................... | G01F 23/284 |
| | | | | 73/290 V |
| 8,711,049 B2 | | 4/2014 | Fehrenbach et al. | |
| 2002/0066314 A1 | * | 6/2002 | Lubbers ................. | G01S 7/032 |
| | | | | 73/290 R |
| 2002/0125971 A1 | * | 9/2002 | Sciarrino ................ | H01P 1/042 |
| | | | | 333/254 |

(Continued)

FOREIGN PATENT DOCUMENTS

| | | |
|---|---|---|
| DE | 102005036844 | 2/2007 |
| DE | 102010031276 | 1/2012 |
| WO | 2015/000656 | 1/2015 |

*Primary Examiner* — Nathaniel T Woodward
(74) *Attorney, Agent, or Firm* — Fay Kaplun & Marcin, LLP

(57) ABSTRACT

A fill level measurement device includes a potential isolation in a waveguide assembly. The waveguide portion is connected to measurement electronics and inserted into a cylindrical recess in the potential isolation and is rotatable therein. A front region of the potential isolation consists of a tubular or conical region having a smaller inner diameter.

14 Claims, 4 Drawing Sheets

(56) References Cited

U.S. PATENT DOCUMENTS

| | | | |
|---|---|---|---|
| 2002/0135508 A1* | 9/2002 | Kleman | G01S 13/08 342/124 |
| 2003/0137372 A1 | 7/2003 | Fehrenbach et al. | |
| 2003/0137447 A1* | 7/2003 | Burger | H01P 5/103 342/124 |
| 2004/0113853 A1* | 6/2004 | Serban | H01Q 1/225 343/703 |
| 2004/0173020 A1* | 9/2004 | Edvardsson | G01F 23/284 73/290 V |
| 2005/0083229 A1* | 4/2005 | Edvardsson | G01F 23/284 342/124 |
| 2006/0071848 A1* | 4/2006 | Edvardsson | G01F 23/284 342/124 |
| 2006/0158371 A1* | 7/2006 | Duivenvoorden | H01P 5/103 342/124 |
| 2007/0008212 A1* | 1/2007 | Serban | H01Q 13/02 342/124 |
| 2007/0028829 A1 | 2/2007 | Griessbaum et al. | |
| 2007/0188396 A1 | 8/2007 | Griessbaum et al. | |
| 2010/0109963 A1* | 5/2010 | Kienzle | G01F 23/284 343/786 |
| 2010/0123615 A1* | 5/2010 | Fehrenbach | H01Q 19/08 342/124 |
| 2013/0113500 A1 | 5/2013 | Chen et al. | |
| 2019/0094060 A1* | 3/2019 | Blodt | G01S 13/30 |
| 2020/0003603 A1* | 1/2020 | Uddh | G01S 13/88 |

* cited by examiner

FILL LEVEL MEASUREMENT DEVICE WITH POTENTIAL ISOLATION IN A WAVEGUIDE

CROSS-REFERENCE TO RELATED APPLICATIONS

This application claims the benefit of the filing date of European Patent Application Serial No. 17 201 675.0 filed on 14 Nov. 2017, the entire content of which is incorporated herein by reference.

FIELD OF THE INVENTION

The invention relates to fill level measurement. The invention relates in particular to a fill level measurement device comprising measurement electronics for generating a transmission signal, and a waveguide for transmitting the transmission signal from the measurement electronics to an antenna.

TECHNICAL BACKGROUND

Known fill level measurement devices comprise measurement electronics designed for generating a transmission signal and for analysing the transmission signal reflected by the filling material surface. A waveguide assembly leads from said electronics to an antenna that then radiates the transmission signal and receives said signal again following the reflection thereof. If the electric potential of the electronics unit of the fill level measurement device is to be isolated from the electric potential of the antenna of the fill level measurement device that is mounted on the container, isolation (potential isolation) can be provided that is located between the electronics and the antenna.

SUMMARY OF THE INVENTION

The invention relates to an effective and advantageous potential isolation for a fill level measurement device.

An aspect of the invention relates to a fill level measurement device, for example a fill level radar that measures in a contactless manner, comprising measurement electronics designed to generate a transmission signal. Said transmission signal is then fed into a first waveguide portion which is adjoined by a second waveguide portion. Potential isolation is arranged between the two waveguide portions, which isolation electrically isolates the two waveguide portions from one another. The entire waveguide assembly (first and second waveguide portion, and potential isolation) is designed for transmitting the transmission signal from the measurement electronics to an antenna of the fill level measurement device.

The potential isolation comprises a front portion that faces the filling material surface and has a first passage, and an adjoining portion that is at the rear when viewed from the filling material surface and has a second passage. The first passage has a smaller cross-sectional area than the second passage, and the second waveguide portion is inserted into the second passage and fastened therein.

The two passages may be cylindrical or conical cut-outs. The inner wall of the second passage is matched to the outer periphery of the second waveguide portion such that said portion is retained in the second passage.

The two passages are permeable to the transmission signal and, according to one embodiment, allow said signal to pass through unimpeded or at least largely unimpeded.

According to another embodiment, the potential isolation consists of an isolating plastics material such as PTFE, PFA, PP, PVDF or PEEK.

According to another embodiment, for reasons of protection against contact or explosion protection, the rigid isolation between the two potentials of the antenna and the measurement electronics has a thickness of at least 0.5 mm.

According to one embodiment, the length of the front portion of the potential isolation is at least 2 mm, in order to comply with air gap and creepage path requirements.

The front portion is for example a tubular portion, and the rear portion is for example also a tubular portion but has a larger inner and optionally also outer diameter than the front portion.

According to another embodiment, the second waveguide portion is mounted in the second passage so as to be rotatable about its longitudinal axis, such that the alignment of the antenna with respect to the measurement device housing can be subsequently adjusted.

According to another embodiment, a stop surface is provided between the inner wall of the first passage and the inner wall of the second passage, which surface the second waveguide portion strikes and which connects the first passage to the second passage.

The stop surface corresponds for example to the end face of the second waveguide portion, such that said end face is in contact in a planar manner with the stop surface. It is also possible for the stop surface to be perpendicular to the inner wall of the front portion and of the rear portion.

It is possible in particular for the inner wall of the front portion of the potential isolation to be connected to the two waveguide portions without forming a step.

According to one embodiment, the cross-sectional area of the first passage corresponds, along the entire length thereof, to the cross-sectional area of the first waveguide portion and optionally also to the cross-sectional area of the second waveguide portion. In other words, in the case of a round waveguide, the inner diameter of the first passage is cylindrical and is identical to the inner diameter of the first waveguide portion.

According to another embodiment, the inner diameter of the first passage is smaller than the inner diameter of the first waveguide portion, such that a step results here.

According to another embodiment, the inner diameter of the first passage at the end of the first passage (i.e. on the side facing the filling material) is equal to the inner diameter of the first waveguide portion, and at the start of the first passage, i.e. in the region of the stop surface, is equal to the inner diameter of the second waveguide portion. If the two waveguide portions have the same inner diameter, this therefore results in a cylindrical first passage.

According to one embodiment, the first waveguide portion has a smaller inner diameter than the second waveguide portion. In this case, it is possible for the first passage to be conical.

According to one embodiment, a snap connection means is provided which is designed for releasably connecting the first waveguide portion to the potential isolation. This snap connection means may be designed in the form of an annular groove in the first waveguide portion in combination with an annular element of the potential isolation that is designed to snap into the groove when the potential isolation is pushed into the first waveguide portion. Alternatively, one or more snap-in elements can also be provided in the potential isolation and corresponding cut-outs provided in the first waveguide portion, such that an anti-turn mechanism is provided.

According to another embodiment, the fill level measurement device comprises a dielectric isolator that is sealingly arranged in the first passage of the potential isolation.

It is possible for the dielectric isolator and the potential isolation to be integral. In this case, the first passage is not a through-hole. Instead, in this case, the term "passage" is to be understood as being permeable to the transmission signal but not air-permeable.

According to another embodiment, the fill level measurement device comprises an antenna that is integrally connected to the first waveguide portion. According to another embodiment of the invention, the first waveguide portion and/or the second waveguide portion is designed as a round waveguide or a square waveguide. If the second waveguide portion is designed as a square waveguide, it is possible for the outer surface of the second waveguide portion to be cylindrical at the location at which it is pushed into the potential isolation, in order to allow for rotation.

Further embodiments will be described in the following. If the same reference signs are specified in the following figures, said signs denote the same or similar elements. The drawings in the figures are schematic and not to scale.

DETAILED DESCRIPTION

Figure 1:
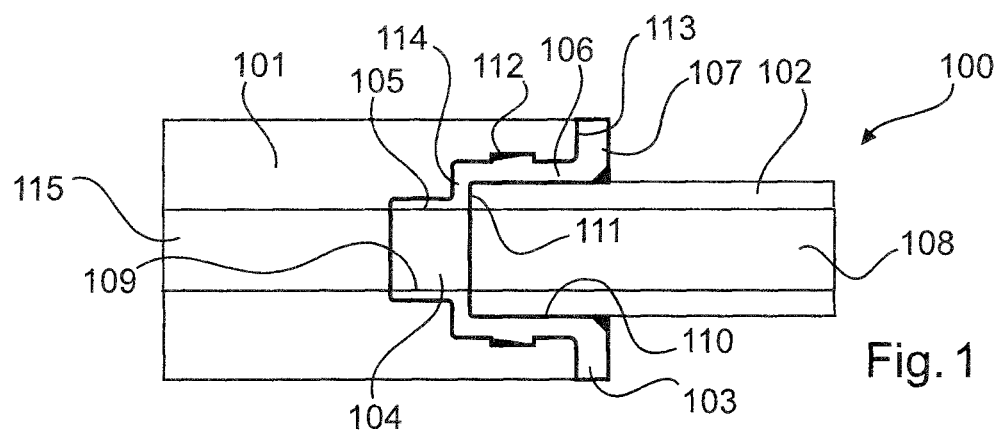
FIG. 1 shows a waveguide assembly according to one embodiment.

FIG. 1 shows a waveguide assembly 100 of a fill level measurement device according to one embodiment. The waveguide assembly comprises a first waveguide portion 101 and a second waveguide portion 102. The second waveguide portion 102 conducts the transmission signal generated by measurement electronics to the second waveguide portion which feeds said signal to the antenna.

Potential isolation 103 is located between the two waveguide portions 101, 102. This potential isolation is a for example integral device made of isolating material such as PTFE, PFA, PP, PVDF or PEEK. This isolating plastics element 103 is integrated entirely or at least in part in the waveguide wall in the connection region between the two waveguide portions 101, 102. This results in good, broadband transmission characteristics of the transmission signal and of the received signal reflected by the filling material surface. For example, it is possible to thus achieve a return loss of greater than 21 dB and a transmission loss of less than 0.9 dB over a frequency range of 8 GHz, for example of between 76 GHz and 84 GHz.

The waveguide portions shown in the figures may be round waveguides or square waveguides. In the case of a square waveguide, it is possible for the outer surface of the second waveguide portion 102 to be round at least in the region that is pushed into the potential isolation, such that said portion can rotate in the potential isolation in order to be able to rotate the electronics with respect to the antenna, which can lead to a favourable installation position and, depending on the antenna design, a favourable orientation of the polarisation plane of the transmission signal.

The potential isolation 103 comprises a front portion 105 which is tubular in the embodiment of FIG. 1. A rear portion 106, 107 adjoins said front portion, which rear portion is also tubular but has a greater inner and outer diameter and has a bend 107 at the end thereof that faces the electronics. Said bend 107 comprises an impact surface 113 that is in contact with the termination surface of the first waveguide portion 101.

A stepped transition 114 is located between the front tubular portion 105 of the potential isolation and the rear portion 106, 107, which transition comprises a stop surface 111 which faces the measurement electronics and which the end face of the second waveguide portion 103 strikes.

The interior 115, 104, 108 of the waveguide assembly 100 does not have a step, since the inner diameter of the first waveguide portion corresponds to the inner diameters of the second waveguide portion and the inner tube of the potential isolation 103.

In other words, the inner plastics tube of the first, front portion 105 of the potential isolation is located entirely in the waveguide wall of the waveguide assembly.

The inner surface 109 of the front portion 105 of the potential isolation is cylindrical. The inner surface 110 of the rear portion 106, 107 of the potential isolation is also cylindrical.

During mounting thereof, the potential isolation 103 can be pushed into a recess at the end of the first waveguide portion 101. A snap connection 112 may be provided, comprising a plurality of separate or one annular snap hook(s) which snap(s) into corresponding recesses or into an annular groove when the potential isolation is pushed completely into the first waveguide portion.

The potential isolation may be elastically deformable, such that the snap connection can be released by pressing the bend 107 together when the second waveguide portion 102 is not pushed into the potential isolation. This makes it possible to easily replace the potential isolation.

The length of the first waveguide portion may be from 10 to 12 mm for example, as can that of the second waveguide portion.

Figure 11:
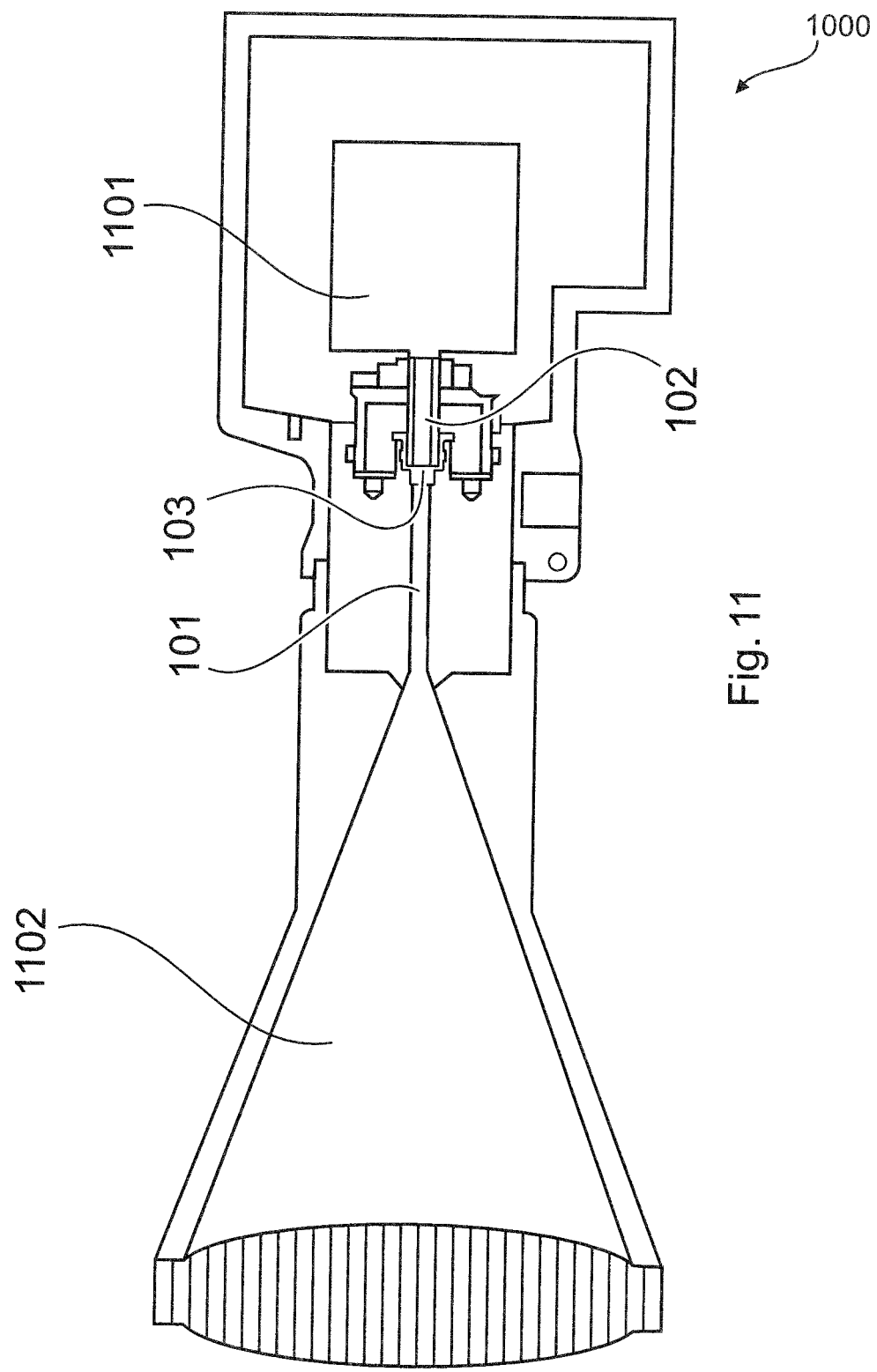
FIG. 11 shows a fill level radar according to one embodiment.

The antenna may be integrally connected to the first waveguide portion 101 or may be attached thereto, as is shown in FIG. 11.

Figure 2:
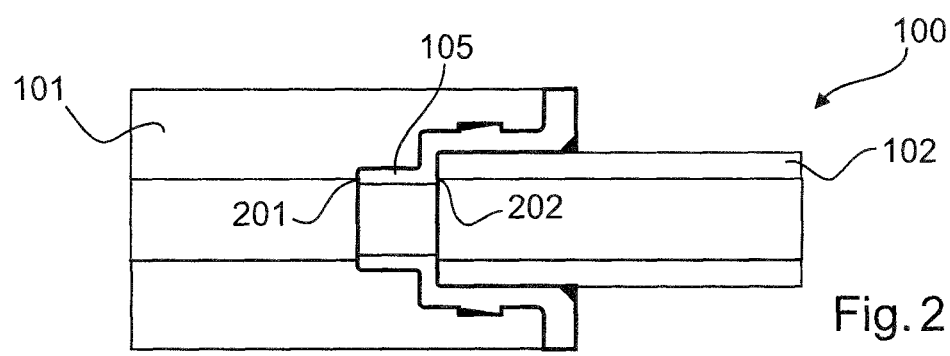
FIG. 2 shows a waveguide assembly according to another embodiment.

FIG. 2 shows a waveguide assembly 100 according to another embodiment. In contrast with the embodiment in FIG. 1, the inner plastics tube 105 is located in the wall of the waveguide assembly in part and inside the waveguide itself, i.e. the "channel" in the interior of the waveguide assembly that conducts the transmission signal, in part. In other words, the inner diameter of the plastics tube 105 is smaller than the inner diameter of the first waveguide portion and of the second waveguide portion 101, 102, with the result that two steps 201, 202 are formed in the interior of the waveguide. Since the hole in the front portion 105 of the potential isolation is smaller than the inner diameter of the front and rear waveguide portion, it is more difficult for contamination to reach the measurement device electronics from the antenna.

Figure 3:
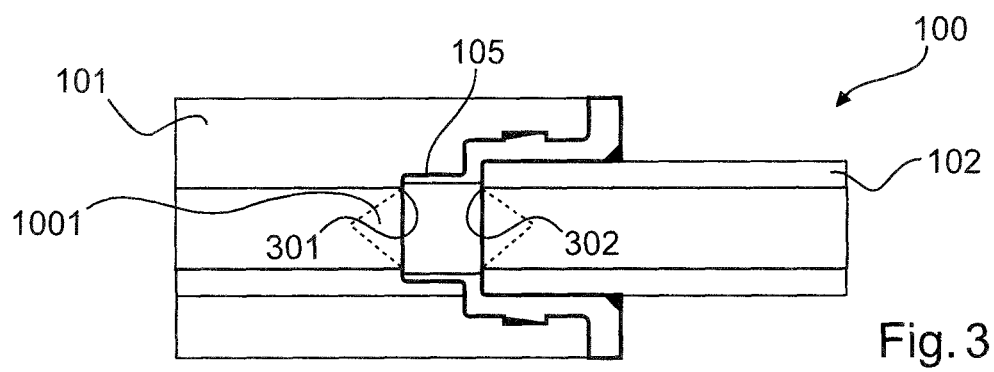
FIG. 3 shows a waveguide assembly according to another embodiment.

FIG. 3 shows another embodiment of the waveguide assembly 100, in which the inner plastics tube of the potential isolation is completely integrated into the wall of the waveguide assembly and is set back with respect to the waveguide wall. In other words, the inner diameter of the front portion 105 is larger than the inner diameter of the first waveguide portion 101 and of the second waveguide portion 102. This makes it possible, for example, for a dielectric isolator comprising two adaptation cones (cf. FIG. 9) to be able to be pushed into the through-opening in the front portion 105 and to then be retained by the edges 301, 302.

Figure 4:
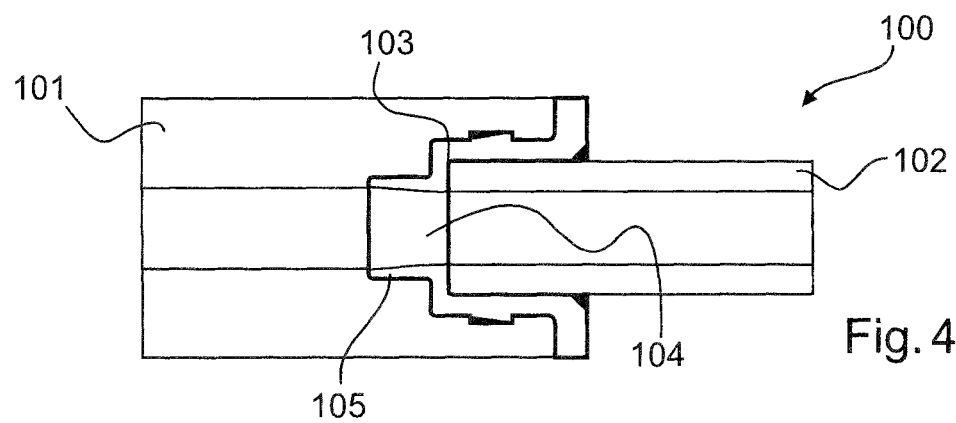
FIG. 4 shows a waveguide assembly according to another embodiment.

FIG. 4 shows another embodiment of a waveguide assembly 100, in which the plastics tube 105 of the potential isolation 103 is located completely inside the waveguide wall without steps being formed. Since the inner diameter of the first waveguide portion 101 is larger than the inner diameter of the second waveguide portion 102, the through-opening 104 of the front portion 105 of the potential isolation is conical and widens towards the antenna. The front portion 105 is conical only on the inside, however, and is cylindrical on the outside.

Figure 5:
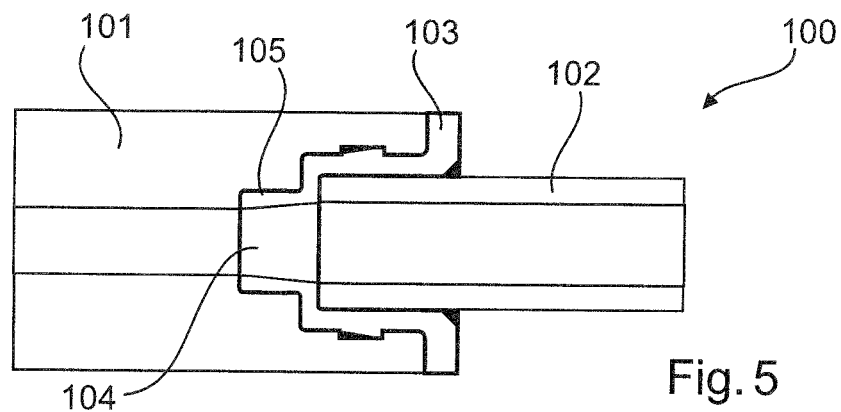
FIG. 5 shows a waveguide assembly according to another embodiment.

FIG. 5 shows an inverted example, in which the inner diameter of the first waveguide portion 101 is smaller than the inner diameter of the second waveguide portion 102. Since no steps are provided, the through-opening 104 in the front portion 105 of the potential isolation 103 is also conical, but widens towards the measurement device electronics. Here, too, the outer surface of the front region 105 is cylindrical.

Figure 6:
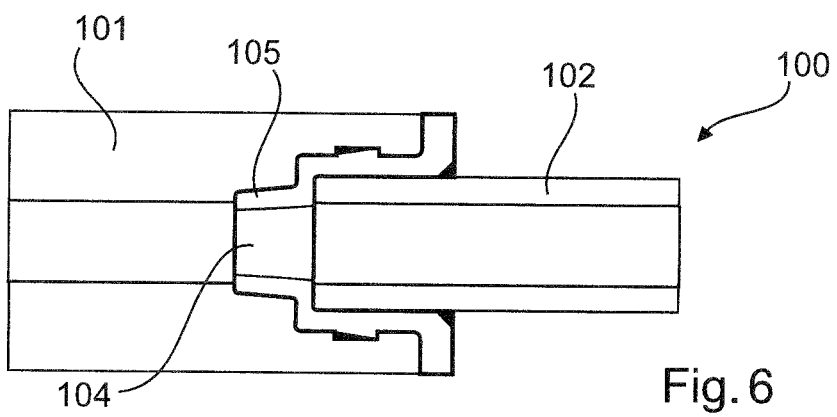
FIG. 6 shows a waveguide assembly according to another embodiment.
Figure 7:
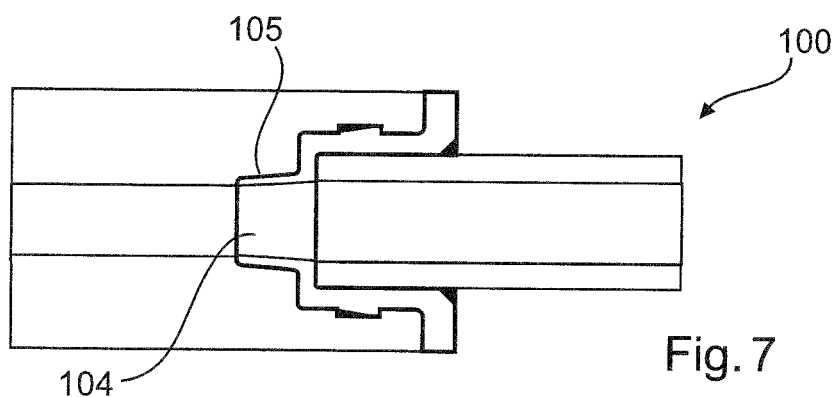
FIG. 7 shows a waveguide assembly according to another embodiment.

In the embodiment according to FIG. 6 and according to FIG. 7, the through-opening 104 of the front portion 105 of the potential isolation is likewise conical; in the embodiment of FIGS. 6 and 7 the outer surface is also conical. According to FIG. 6, two steps are provided, since the inner plastics tube 105 of the potential isolation is located inside the waveguide wall only in part. A jump in diameter occurs between the individual waveguide portions in the front portion 105 of the potential isolation. In contrast with the embodiment of FIG. 6, no such jump in diameter is provided in the embodiment according to FIG. 7. Instead, the transitions in the interior of the waveguide are continuous.

Figure 8:
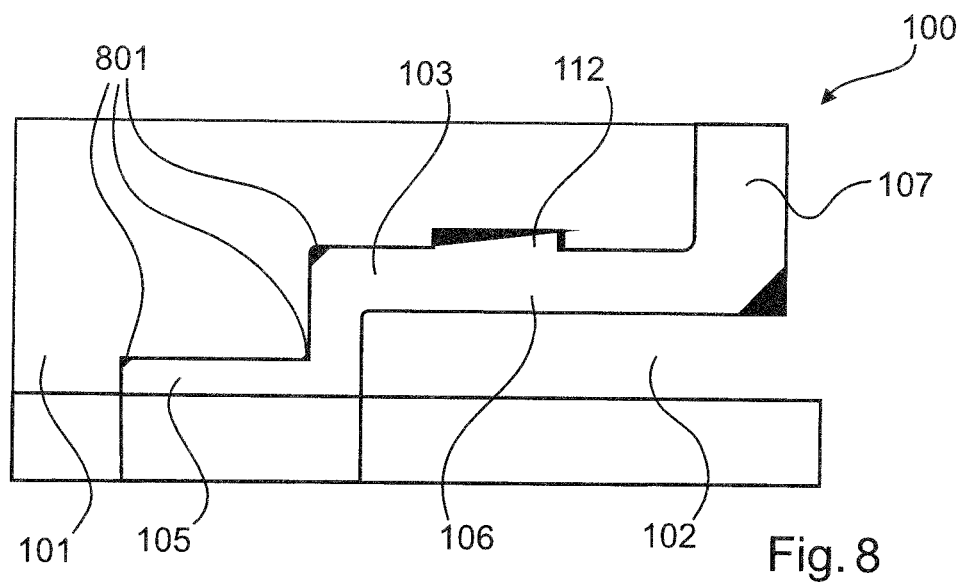
FIG. 8 shows a waveguide assembly according to another embodiment.

FIG. 8 is a detailed view of a waveguide assembly 100, in which chamfers or radii are provided on the edges 801 of the potential isolation. This makes it possible to simplify mounting of the potential isolation.

Instead of a snap hook device 112 arranged in an annular manner, it is also possible to provide a plurality of snap hooks or fastening devices that are peripheral only in part for the purpose of fastening, securing and protection against falling out when the electronics is not inserted. This also provides an anti-turn mechanism.

Figure 9:
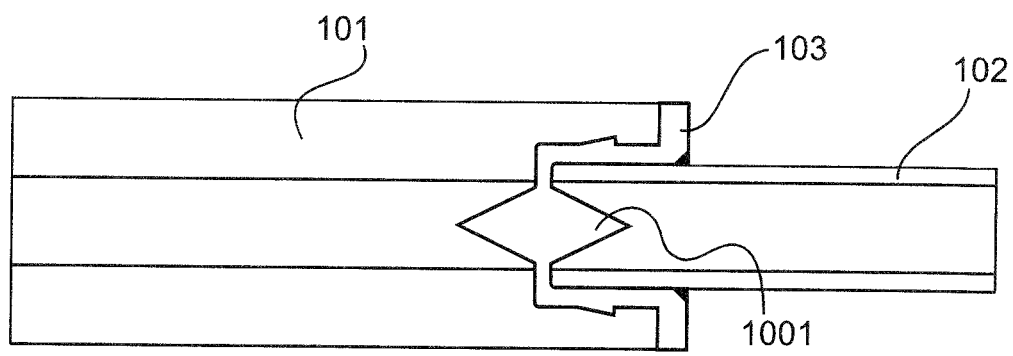
FIG. 9 shows a waveguide assembly according to another embodiment.

FIG. 9 shows a waveguide assembly comprising an isolator 1001 that is integrated in the potential isolation and is connected to the step-like transition 114 of the potential isolation 103. As in the embodiment of FIG. 9, it is possible for the isolator to be integral with the potential isolation.

Figure 10:
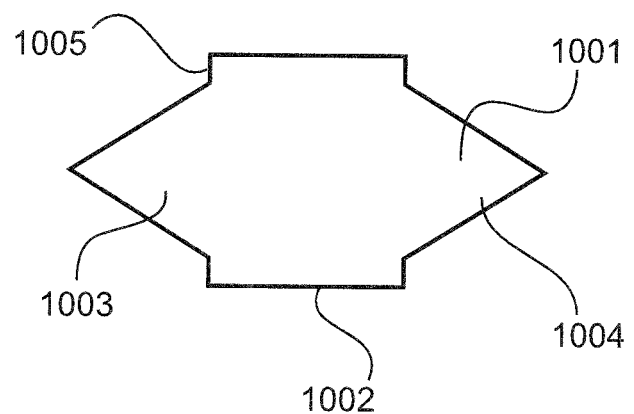
FIG. 10 shows an isolator for insertion into a potential isolation.

FIG. 10 shows an isolator 1001 that is intended to be inserted into a potential isolation according to another embodiment. The isolator comprises a cylindrical (or conical) region 1002 which is adjoined by an adaptation cone 1003, 1004 at the front and at the rear in each case. The region 1002 may have a larger (or smaller) diameter than the adaptation cones 1003, 1004. The potential isolation into which the isolator is pushed is adapted to the outer contour of the isolator in such a way as to be retained in the potential isolation.

FIG. 11 shows a fill level measurement device 1000 comprising measurement electronics 1101 that is connected to the second waveguide portion 102, and an antenna 1102, for example a horn antenna, that is connected to the first waveguide portion 101. The antenna 1102 is integrally connected to the first waveguide portion 101 for example.

It should be noted in addition that "comprising" and "having" do not exclude any other elements or steps, and the indefinite article "a" or "an" does not exclude a plurality. Furthermore, it should be noted that features or steps that have been described with reference to the above embodiments can also be used in combination with other features or steps of other embodiments described above. Reference signs in the claims are not to be considered limiting.

The invention claimed is:

1. A fill level measurement device, comprising:
   an antenna;
   measurement electronics generating a transmission signal; and
   a waveguide assembly comprising a first waveguide portion, a second waveguide portion, the first and second waveguide portions having different inner diameters and a potential isolation arranged between the first and second waveguide portions for transmitting the transmission signal from the measurement electronics to the antenna,
   wherein the potential isolation includes a front portion in form of a plastics tube having a first passage and an adjoining rear portion having a second passage, a cross-section area of the first passage being smaller than a cross-sectional area of the second passage,
   wherein the first passage is conical such that the plastics tube of the potential isolation is completely or at least in part integrated into the wall of the waveguide assembly, and
   wherein the second passage has an inner wall that is matched to the outer periphery of the second waveguide portion such that the second waveguide portion is retained in the second passage.

2. The fill level measurement device according to claim 1, wherein the second waveguide portion is mounted in the second passage so as to be rotatable about its longitudinal axis.

3. The fill level measurement device according to claim 1, wherein a stop surface is provided between an inner wall of the first passage and an inner wall of the second passage, which surface the second waveguide portion strikes and which connects the first passage to the second passage.

4. The fill level measurement device according to claim 3, wherein an end face of the second waveguide portion corresponds to the stop surface.

5. The fill level measurement device according to claim 3, wherein an inner diameter of the first passage at a first end of the first passage corresponds to an inner diameter of the first waveguide portion and at a second end of the first passage, in a region of the stop surface, corresponds to an inner diameter of the second waveguide portion.

6. The fill level measurement device according to claim 1, wherein an inner diameter of the first passage corresponds to an inner diameter of the first waveguide portion throughout.

7. The fill level measurement device according to claim 1, wherein an inner diameter of the first passage is smaller than an inner diameter of the first waveguide portion.

8. The fill level measurement device according to claim 1, wherein an inner diameter of the first waveguide portion is a smaller than an inner diameter of the second waveguide portion.

9. The fill level measurement device according to claim 1, wherein the first passage has a conical shape.

10. The fill level measurement device according to claim 1, further comprising:
   a snap connection arrangement releasably connecting the first waveguide portion to the potential isolation.

11. The fill level measurement device according to claim 1, further comprising:
   a dielectric isolator sealingly arranged in the first passage of the potential isolation.

12. The fill level measurement device according to claim 11, wherein the dielectric isolator and the potential isolation are integral.

13. The fill level measurement device according to claim 1, wherein the antenna is integrally connected to the first waveguide portion.

14. The fill level measurement device according to claim 1, wherein the first waveguide portion and/or the second waveguide portion is designed as a round waveguide or a square waveguide.

* * * * *